US008635671B2

(12) United States Patent
Wood et al.

(10) Patent No.: US 8,635,671 B2
(45) Date of Patent: *Jan. 21, 2014

(54) SYSTEMS AND METHODS FOR A SECURITY DELEGATE MODULE TO SELECT APPROPRIATE SECURITY SERVICES FOR WEB APPLICATIONS

(75) Inventors: Thomas Alexander Wood, Raleigh, NC (US); John J. Eckersberg, II, Apex, NC (US); Daniel P. Radez, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/118,841

(22) Filed: May 31, 2011

(65) Prior Publication Data
US 2012/0311671 A1   Dec. 6, 2012

(51) Int. Cl.
H04L 29/06          (2006.01)

(52) U.S. Cl.
USPC ............................... 726/4; 713/166; 713/168

(58) Field of Classification Search
USPC ....................................... 726/4; 713/166, 168
See application file for complete search history.

(56) References Cited

U.S. PATENT DOCUMENTS

| | | | |
|---|---|---|---|
| 7,676,829 B1* | 3/2010 | Gui et al. | 726/5 |
| 7,891,001 B1* | 2/2011 | Greenawalt et al. | 726/22 |
| 2003/0154401 A1* | 8/2003 | Hartman et al. | 713/201 |
| 2004/0006590 A1* | 1/2004 | Lucovsky et al. | 709/203 |
| 2004/0015596 A1* | 1/2004 | Sapuram et al. | 709/230 |
| 2004/0168090 A1* | 8/2004 | Chawla et al. | 713/201 |
| 2005/0005094 A1* | 1/2005 | Jamieson et al. | 713/155 |
| 2005/0028011 A1* | 2/2005 | Motoyoshi et al. | 713/201 |
| 2005/0114701 A1* | 5/2005 | Atkins et al. | 713/201 |
| 2008/0028203 A1* | 1/2008 | Sakai | 713/150 |
| 2008/0028453 A1* | 1/2008 | Nguyen et al. | 726/9 |
| 2008/0046961 A1* | 2/2008 | Pouliot | 726/1 |
| 2008/0077809 A1* | 3/2008 | Hayler et al. | 713/193 |
| 2008/0313719 A1* | 12/2008 | Kaliski et al. | 726/5 |
| 2010/0071024 A1* | 3/2010 | Eyada | 726/1 |
| 2010/0107222 A1* | 4/2010 | Glasser | 726/3 |
| 2011/0202988 A1* | 8/2011 | Otranen et al. | 726/8 |
| 2011/0265166 A1* | 10/2011 | Franco et al. | 726/7 |
| 2012/0144464 A1* | 6/2012 | Fakhrai et al. | 726/6 |

OTHER PUBLICATIONS

Wood et al., "Systems and Methods for Generating Modular Security Delegates for Applications", U.S. Appl. No. 13/040,774, filed Mar. 4, 2011.
Wood et al., "Systems and Methods for Generating Modular Security Delegates for Applications", U.S. Appl. No. 13/048,142, filed Mar. 15, 2011.

* cited by examiner

*Primary Examiner* — Michael Pyzocha
(74) *Attorney, Agent, or Firm* — Lowenstein Sandler LLP

(57) ABSTRACT

In accordance with some aspects of the present disclosure, a method is disclosed that can include receiving, by a security delegate module, a set of user authentication credentials by an application running a first instance in a network for a user; determining, by the security delegate module, a type of the application; and selecting, by the security delegate module, a security service based on the set of user authentication credentials and the type of application.

15 Claims, 4 Drawing Sheets

SYSTEMS AND METHODS FOR A SECURITY DELEGATE MODULE TO SELECT APPROPRIATE SECURITY SERVICES FOR WEB APPLICATIONS

FIELD

This invention relates generally to authenticating user credentials using a separate modular security delegate and corresponding security service for applications.

DESCRIPTION OF THE RELATED ART

There are many applications that require access by multiple types of users. For example, administrators who can have high levels of access, external users who can have lower levels of access, employees of a company that is providing the application who can have middle levels of access, etc. For each type of user/access, the applications can provide different functionality, which can be protected by requiring a specific level of security for each user type.

However, in many applications, building in multiple authentication and authorization levels can pose a problem, if, for example, different authentication mechanisms and/or authorization mechanisms are used. As used herein, authentication and authentication mechanisms can be directed to determining if the user is the actual user identified, whereas authorization and authorization mechanisms can be directed to determining the role and/or functionality allowed for the user. As will be understood, authentication and authorization mechanisms are well known in the art and will be briefly discussed herein as needed.

The different authentication mechanisms can include, but are not limited to, Kerberos, SSL, digest authentication, NT LAN manager authentication protocol, tokens, virtual remote security access, LDAP authentication, etc. For example, if an application is set up to authenticate against a user database and an LDAP directory and both the user database and the LDAP directory have an account for the user, an ambiguity is created because the application does not know whether to authenticate against the database or the LDAP. In another example, if the application is capable of accepting multiple forms of authentication, this can create an unacceptable level of risk since it could expose, for example, internal corporate authentication mechanisms to brute-force attacks from, for example, the Internet.

Therefore, there is a need to ensure that all types of users can use various applications and that authentication is as strong as necessary for various applications and environments.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
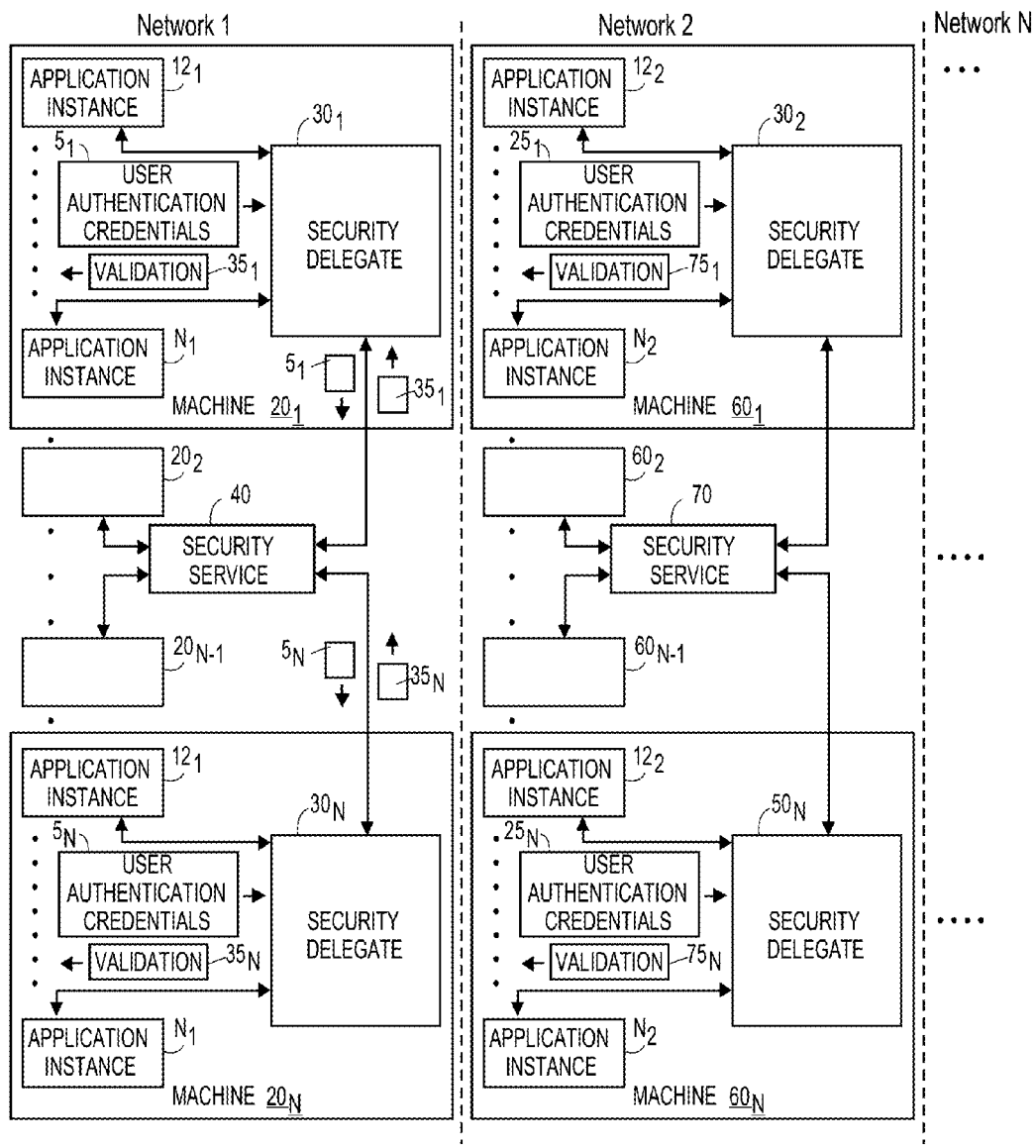
FIG. 1 illustrates an embodiment of a plurality of networks that include security delegates, in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for generating modular security delegates for applications, including, for example, applications usable on physical machines, virtualized environments, in the cloud, etc. According to embodiments, in a multiple network environment, multiple machines (that can be, for example, clients, containers, Java virtual machines (JVM), etc.) can be configured. Each machine can include a plurality of application instances, a directory interface, and a security delegate. The directory interface can communicate with a directory, for example, a naming directory (as in Java), that can be instantiated in each machine environment. The security delegate can be a service, an application, a wrapper, a DLL, code, a proxy, a Java class, a Java bean, etc. In addition, each network environment can include a communication interface to security services. Security services can include, but are not limited to, any internal or third party hosting service that can authenticate and/or authorize users. For example, security services can use Kerberos, NT Lan Manager (NTLM) authentication protocol, secure sockets layer/transport security layer (SSL/TSL), token authentication, virtual private network (VPN), remote access security (RAS), digest authentication, LDAP authentication etc., for authentication.

In accordance with some aspects of the present disclosure, a method is disclosed. The method can include receiving, by a security delegate module, a set of user authentication credentials by an application running a first instance in a network for a user; determining, by the security delegate module, a type of the application; and selecting, by the security delegate module, a security service based on the set of user authentication credentials and the type of application.

The method can also include authenticating, authorizing, or both, the user to use the application.

The security service can include a variety of authentication/authorization protocols, for example, Kerberos, NT Lan Manager (NTLM) authentication protocol, secure sockets layer/transport security layer (SSL/TSL), token authentication, virtual private network (VPN), remote access security (RAS) and digest authentication, LDAP authentication.

In some aspects, the selecting can include identifying an origin of the user authentication credentials and/or identifying a type of user. The type of user can include a user internal to the network or a user external to the network, wherein the user can be associated with a security level for accessing the network or the application. The type of application can be associated with a security level.

In accordance with some aspects of the present disclosure, an apparatus is disclosed. The apparatus can include a security delegate module configured to receive a set of user authentication credentials by an application running a first instance in a network for a user and to select a security service for the set of user authentication credentials and the application.

The security delegate module can be configured to authenticate, authorize, or both, the user to use the application. The security service can include a variety of authorization/authentication protocols, for example, Kerberos, NT Lan Manager (NTLM) authentication protocol, secure sockets layer/transport security layer (SSL/TSL), token authentication, virtual private network (VPN), remote access security (RAS), digest authentication and LDAP authentication. The security delegate module can be configured to identify an origin of the user authentication credentials. The security delegate module can be configured to identify a type of user. The type of user can include a user internal to the network or a user external to the network. The user can be associated with a security level for accessing the network or the application. The security delegate module can be configured to identify a type of application. The type of application can be associated with a security level.

In accordance the aspects of the present disclosure, a system is disclosed. The system can include a network, the network including a security delegate module configured to receive a set of user authentication credentials by an application running a first instance in a network for a user and to select a security service for the set of user authentication credentials and the application.

According to embodiments, the applications do not authenticate user credentials themselves. Instead, the applications can include logic that indicates what security delegate to use for a given set of user authentication credentials. For example, the applications can include logic that points to a directory that includes the appropriate security delegate for a given application instance. The security delegate can also include logic to select the appropriate security service for a set of user credentials and the application. The selection can be based on various information, including the user credentials supplied by the web application, the type of web application, etc. For example, the selection of the security service can be based on where the security credentials originated (what service), the type of user (e.g., internal, including executive, security, administrator, financial, human resources, engineer, etc.; or external, including vendor government vendor, client, etc.; the type of web application, including low security, high security; and other. User authentication credentials can include, but are not intended to be limited to, tokens, usernames, passwords, keys, generated random numbers, certificates, tickets, etc. According to embodiments, the logic can be configured to determine the appropriate security delegate using various methods. For example, the appropriate security delegate can be based on which application instance received the user credentials, the network location of the directory, the network location of the application instance, machine identity, etc. Alternatively, the type of user or class of authentication credentials received can be used to determine the appropriate security delegate.

According to embodiments, the security delegates can receive a set of user authentication credentials from application instances and determine whether the set of user authentication credentials are valid. Each security delegate can correspond to one type of authentication mechanism. For example, one security delegate can determine if Kerberos credentials are valid, another security delegate can determine if SSL credentials are valid, etc. Also, each application instance can send the set of user authentication credentials to one security delegate (e.g., there can be a one to one correspondence).

The level of security used by each security delegate in each corresponding network can be determined by, for example, owners of the network, administrators, operators, cloud providers, etc. Also, the term network as used herein can include physical networks, virtual networks, cloud networks, clusters, sub-nets, partitions, etc.

FIG. 1 illustrates an example of multiple network environments 1, 2 . . . N that can include multiple machines $20_1$ to $20_N$, $60_2$ to $60_N$, etc. For purposes of this description, it is assumed that each machine contains the same general elements in each network and therefore, a single machine for networks 1 and 2 with reference to FIG. 1 will be described. Machine $20_1$ can include a plurality of application instances $12_1$ to $N_1$ and a security delegate $30_1$. The security delegate $30_1$ can include a communication interface (not shown) that allows security delegate $30_1$ to communicate with a security service 40 within the same network 1. The application instances $12_1$ to $N_1$ within machine $20_1$ can be the same or different. For example, application instance $12_1$ can be a procurement application and application instance $12_N$ can be another instance of the procurement application or an instance of a messaging application. In addition, the application instances across machines $20_1$ to $20_N$ in the same network 1 can be the same or different depending on each machine's current use. For example, application instance $12_1$ can be a procurement application in machine $20_1$ whereas application $12_1$ can be a messaging application in machine $20_N$. It will be understood that while examples of certain network components are illustrated, other well known components can be included, for example, servers, other machines, applications, ports, etc.

Similarly, in network 2, machine $60_1$ can include a plurality of application instances $12_2$ to $N_2$ and a security delegate $50_1$. The security delegate $50_1$ can include a communication interface (not shown) that allows security delegate $50_1$ to communicate with a security service 70 within the same network 2. The application instances $12_2$ to $N_2$ within machine $60_1$ can be the same or different. For example, application instance $12_2$ can be a procurement application and application instance $N_2$ can be another instance of the procurement application or an instance of a messaging application. In addition, the application instances across machines $60_1$ to $60_N$ in the same network can be the same or different depending on each machines' current use. For example, application instance $12_2$ can be a procurement application in machine $60_1$ whereas application $12_2$ can be a messaging application in machine $60_N$.

As can be seen in FIG. 1, while the network components are similar within networks 1, 2 . . . N, across networks 1, 2 . . . N there are some distinctions. For example, each machine 20 in network 1 can have a corresponding machine 60 in network 2 shown by the subscript number. The application instances $12_1$ to $N_1$ can be instances of the same application corresponding to each network 1, 2 . . . N, as identified by the subscript number. Also, the security delegate $30_1$ in network 1 has a corresponding defined security (security service 40) associated with it, as does security delegate $60_1$ (security service 70). In various embodiments, the defined authentication mechanism will be different between networks. For example, network 1 can correspond to an internal network, for example, an internal corporation LAN or WAN, whereas network 2 can correspond to an external network, for example, the internet. Network N can also correspond to, for example, an external network, such as the internet but using a different authentication mechanism. Generally, networks 1, 2 ... N can be or include the Internet, other public, and/or private networks. The networks 1, 2 ... N can also be or include wired, wireless, optical, and other network connections. One skilled in the art will realize that the networks 1, 2 ... N can be any type of network, utilizing any type of communication protocol, to connect computing systems. Also, one skilled in the art will realize that a plurality of networks can be used, as long as different defined security levels are applied to each.

According to embodiments, a user and an application can be associated with a certain level of security. For example, the user can be an employee of a corporation who can use the corporation's internal network. Alternatively, the user can be an external user (not an employee of the corporation) using, for example, the internet and have RAS credentials. For purposes of this embodiment, a two network embodiment will be used, where the corporation's internal network corresponds to network 1 and the internet corresponds to network 2. In this embodiment, an application 12 (not shown) can be accessed by a user. The application 12 is viewable from both network 1 and network 2. For example, the application 12 is viewable in network 1 through application instance $12_1$ and in network 2 through application instance $12_2$. As discussed above, there can be any number of applications and corresponding instances.

In this embodiment, the corporation can decide on the level of security required for each type of user and for each instance or type of application. For example, an internal user can be authenticated by a strong authentication mechanism, e.g., Kerberos, and an external user can be authenticated by a weaker authentication mechanism, e.g., RAS. Additionally, one instance or type of an application that the user is using can be assigned a different level of security than another instance or type of application. The authentication mechanism used can be based on various parameters, for example, regulatory requirements, compliance requirements, etc. It will be obvious that in view of the network requirements, various authentication mechanisms, for example, Kerberos, NT Lan Manager (NTLM) authentication protocol, secure sockets layer/transport security layer (SSL/TSL), token authentication, virtual private network (VPN), remote access security (RAS), digest authentication, LDAP authentication, etc., can be used for each network.

It is assumed for purposes of this embodiment that a set of user authentication credentials 5 or 25 have been obtained by the user by any known method, for example, by a user registering with, for example, the corporation and/or a corresponding security service.

For a user having access to network 1, application 12 can be instantiated in machine $20_1$. The application instance $12_1$ can request a set of user authentication credentials $5_1$, for example, through a log-in screen, from the user. The user can enter in the set of user authentication credentials $5_1$, for example, a user-name, a password, a token, etc. Once the application 12 (not shown) receives the set of user authentication credentials 5, the application 12 can identify the corresponding security delegate $30_1$. The application 12 can identify the corresponding security delegate $30_1$ using, for example, a directory interface (not shown) to a directory (not shown) that can list the appropriate security delegate $30_1$ based on, for example, the network location of the corresponding application instance $12_1$ that received the user authentication credentials $5_1$, the network location of the directory, etc. The directory can be, for example, a naming directory (as in Java), that can be instantiated in each machine environment. As network 1 has a corresponding defined security level (e.g., strong), the security delegate $30_1$ can be configured to apply the same defined security level using the designated authentication mechanism (e.g., Kerberos) to validate the set of user authentication credentials $5_1$ sent from application instance $12_1$. As shown in FIG. 1, security delegate $30_1$ can communicate through an interface (not shown) with a security service 40.

The security service 40 can include, for example, servers, databases, communication interfaces, etc. based on given authentication and/or authorization mechanisms. In this embodiment, security service 40 can correspond to Kerberos authentication. The security delegate $30_1$ can communicate with security service 40 to validate the set of user authentication credentials $5_1$. Validation $35_1$ can be performed by various known methods based on the authentication mechanism used.

For a user having access to network 2, the user instantiates application 12 in machine $20_2$. The application instance $12_2$ can request a set of user authentication credentials $25_1$, for example, through a log-in screen, from the user. The user can enter in the set of user authentication credentials $25_1$, for example, a user-name, a password, a token, etc. Once the application 12 (not shown) receives the set of user authentication credentials 25, the application 12 can identify the corresponding security delegate $50_1$. The application 12 can identify the corresponding security delegate $50_1$ using, for example, a directory interface (not shown) to a directory (not shown) that can list the appropriate security delegate $50_1$ based on, for example, the network location of the corresponding application instance $12_2$ that received the user authentication credentials $75_1$, the network location of the directory, etc. The directory can be, for example, a naming directory (as in Java), that can be instantiated in each machine environment. As network 2 has a corresponding defined security level (e.g., less strong), the security delegate $50_1$ can be configured to apply the same defined security level using the designated authentication mechanism (e.g., RAS) to validate the set of user credentials $25_1$ sent from application instance $12_2$. As shown in FIG. 1, security delegate $50_1$ can communicate through an interface (not shown) with a security service 70.

The security service 70 can include, for example, servers, databases, communication interfaces, etc. based on a given authentication mechanism. In this embodiment, security service 70 can correspond to RAS. The security delegate $50_1$ can communicate with security service 70 to validate the set of user authentication credentials $25_1$. Validation $75_1$ can be performed by various known methods based on the authentication mechanism used.

One example of a situation in which the plurality of networks shown in FIG. 1 can be used can be for procurement. For example, a corporation needs to procure various items using an application that allows both internal employees to request an item and external suppliers to bid on supplying the requested item. However, in this example the corporation can want to allow different functionality and access privileges to each type of user (external and internal), for example, and for each instance or type of application to protect various parts of the internal network and proprietary information. In such an example, the internal network can be accessed by internal employees having strong security credentials, e.g., based on Kerberos, whereas the external suppliers can access the application via an external network, where the external network uses a less strong security, e.g., RAS. Additionally, one instance or type of application can be associated with one level of security, while another instance or type of application can be associated with another, for example, a higher or lower, level of security.

Figure 2:
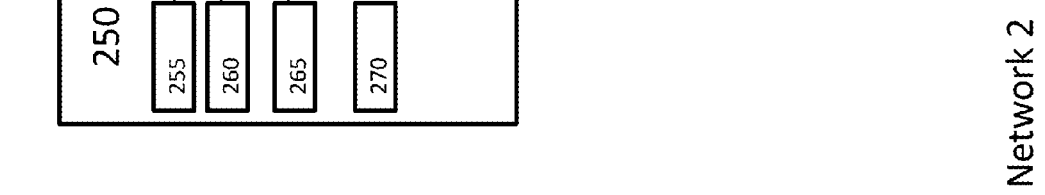
FIG. 2 shows an exemplary system for in accordance with aspects of the present disclosure.
Figure 2:
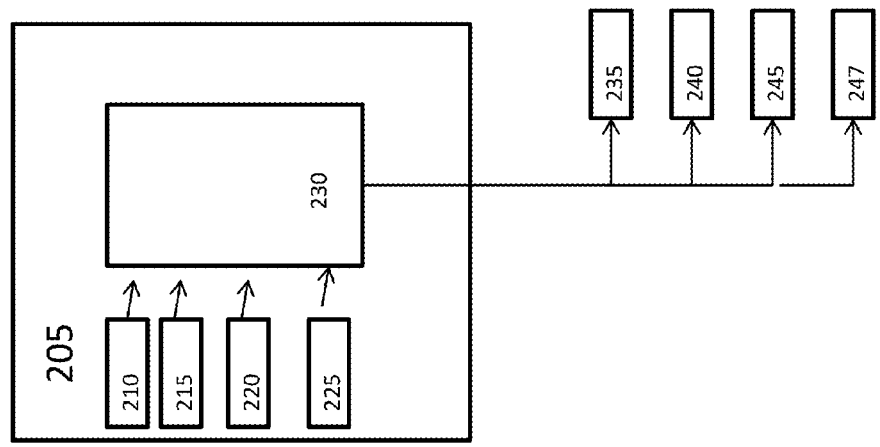

FIG. 2 shows an exemplary system for in accordance with aspects of the present disclosure. In FIG. 2, two networks, network 1 and network 2, are shown. Merely for description purposes, network 1 is considered to be an internal network and network 2 is considered to be an outside network. Machine 205 is connected to network 1 and machine 250 is connected to network 2. A first user of machine 205 in network 1 may wish to have access to services provided by network 1, network 2 or both. The first user of machine 205 can enter a set of user credentials into machine 205 in order to access the services. The user credentials and application identification used by the first user, as represented by 210 can be sent to security delegate 230. Based on the set of user credentials and application identification received by security delegate 230, security delegate 230 can determine a particular security service to be used for a particular user and/or application. By way of a non-limiting example, a first user accessing a first application with user credentials 210 may require security services 235. Similarly, the first user accessing a second application may require security service 240. A second user accessing the first application may require security service 245 and the second user accessing the second application may require security services 247.

Likewise, a first user of machine 250 in network 2 may wish to have access to services provided by network 1, network 2 or both. The first user of machine 255 can enter a set of user credentials into machine 250 in order to access the services. The user credentials and application identification used by the first user, as represented by 260 can be sent to security delegate 275. Based on the set of user credentials and application identification received by security delegate 275, security delegate 275 can determine a particular security service to be used for a particular user and/or application. By way of a non-limiting example, a first user accessing a first application in network 2 with user credentials 255 may require security services 280. Similarly, the first user accessing a second application in network 2 may require security service 285. A second user accessing the first application may require security service 290 and the second user accessing the second application may require security services 295.

By way of a non-limiting example, a user or class of users may require a higher level of security than another user or class of users. This different level of security can also be tailor to the type of network and/or application the user or class of users are accessing. Continuing with the example, a financial class of user may require a higher level of security than an administrative class of user. Moreover, within the financial class, security can be further tailor to different types of users in the financial class. For example, a financial manager, such as a CFO, may require an even higher level of security, authentication and/or authorization than an accounts payable or receivable employee.

Further, different access rights for applications, services and/or data can be determined based on the user credentials, type of network and/or application. For example, the CFO may be granted full access rights, such as read, write, overwrite and the ability to access related information such as an access log or different versions, while another user may only be able to have view access. Certain access rights may only be available within certain networks, certain services, certain applications and/or certain user or class of users as determined by the particular security service. For example, within a management class of user, the CFO may be granted to ability to create and/or edit a companies financial statements while in an internal network and may only be able to view those documents while in an external network. Another user within the same management class, for example a COO, may only have view access to those documents while in the internal network and may have no access while in an external network.

By way of a further non-limiting example, services and/or data rights provided either network (network 1 or network 2) can be tailored based on the set of user credentials, the network that the user is accessing the services and/or data from, and/or the instance or type of application that the user is using to access the services and/or data. For example, a user or class of users attempting to access services and/or data from an external network may not be granted permission or access rights that a user or class of users from an internal network may have permission or access rights.

In accordance with aspects of the present disclosure, integrity and/or consistency of records within a database within either network 1 or network 2 can be maintained by selectively "locking" those records that are being accessed by a particular user. For example, when a user from network 1 is actively accessing a particular record in a database, and another user from either network 1 or network 2, attempts to gain access to that particular record, the second user can be notified that that particular record is in a "locked" state that is unable to be accessed at that particular time. This ensures that multiple updates to a particular record do not occur at the same time and the records within the database can maintain a level of integrity and consistency.

In some aspects of the present disclosure, each machine 20 can have a corresponding security delegate 30 that in turn communicates through a communication interface (not shown) with a security service 40 also having the same defined security level. The defined security level can be based on the type of user, for example, users from different departments within a company (financial, human resources, engineering, executives, etc.), different levels of users (executives, directors, engineers, etc.), and others.

In some aspects of the present disclosure, additional networks (and/or physical networks, virtual networks, cloud networks, clusters, sub-nets, partitions, etc.) can be added so that there can be a third network, a fourth network, etc. According to these embodiments, each network can have a different security level and a corresponding different security delegate/security service.

Figure 3:
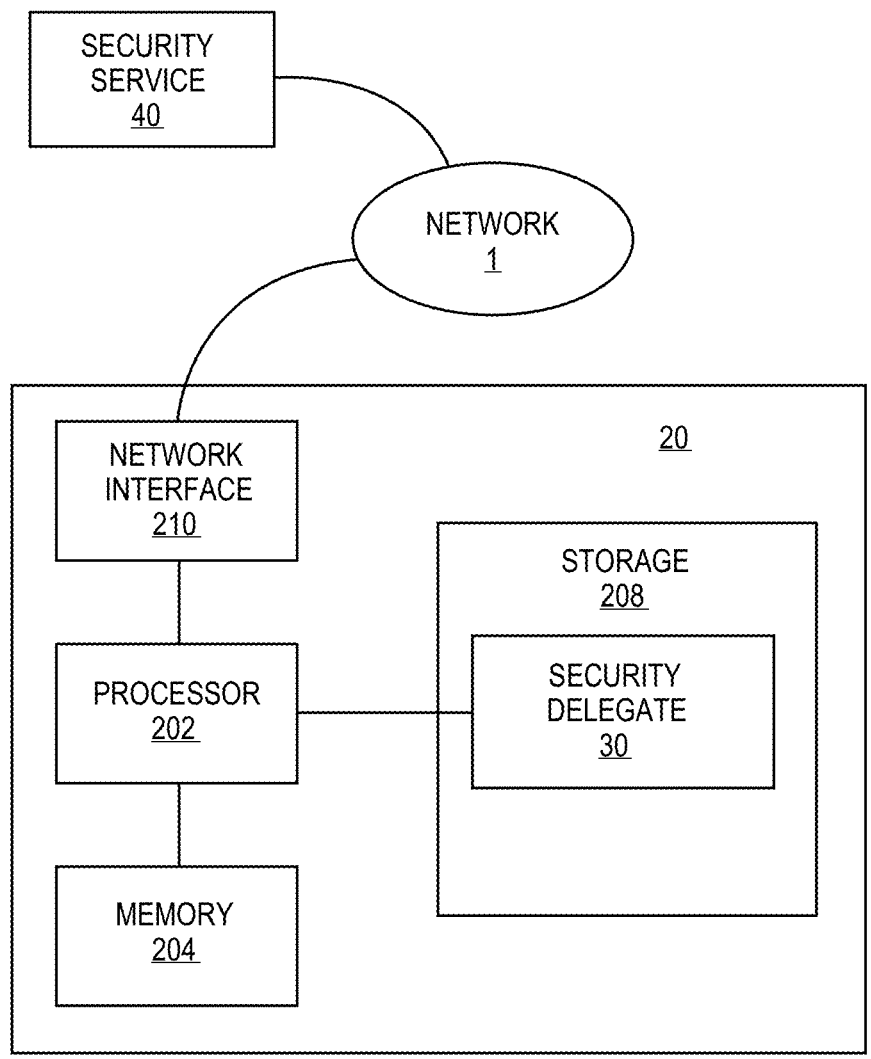
FIG. 3 illustrates an exemplary hardware configuration for an security delegate, according to various embodiments.

FIG. 3 illustrates an exemplary diagram of hardware and other resources that can be incorporated in any of the machines 20, and configured to store and execute the security delegate 30, according to embodiments. In embodiments as shown, the machines 20 can comprise a processor 202 communicating with a memory 204, such as electronic random access memory. The processor 302 also communicates with one or more computer readable storage devices or media 208, such as hard drives, optical storage, and the like, for maintaining the security delegates 30. The processor 202 further communicates with network interface 210, such as an Ethernet or wireless data connection, which in turn communicates with one or more networks 1, such as the Internet or other public or private networks. The machine 20 can also communicate with a security service 40 through network 1 and network interface 210.

The processor 202 also communicates with the security delegates 30 to execute the logic of the security delegates 30 and to allow performance of the processes as described herein. Other configurations of the machines 20, associated network connections, and other hardware and software resources are possible.

While FIG. 3 illustrates the machines 20 as a standalone system including a combination of hardware and software, the machines 20 can include multiple systems operating in cooperation. As described above, the security delegate 30 can be implemented as an application program capable of being executed by the machines 20, as illustrated, or other conventional computer platforms. Likewise, the security delegate 30 can also be implemented as a software module or program module capable of being incorporated in other software applications and programs. In any example, the security delegate 30 can be implemented in any type of programming language. When implemented as an application program, application module, or program code, the security delegate 30 can be stored in a computer readable storage medium, such as the storage 208, accessible by the machine 20. Likewise, during execution, a copy of the security delegate 30 can be stored in the memory 204.

Figure 4:
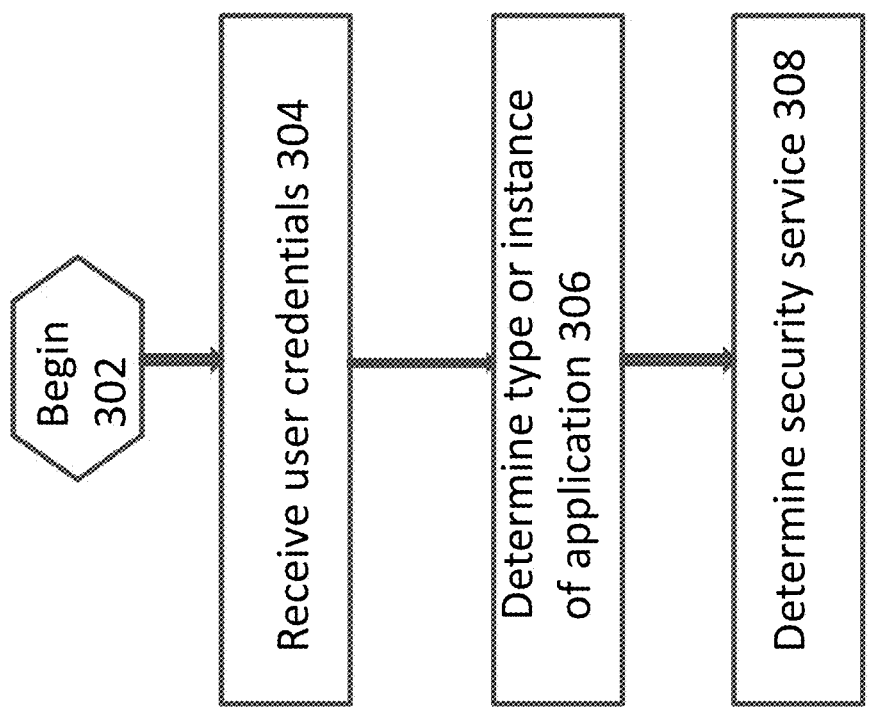
FIG. 4 illustrates a flowchart of an exemplary process for selecting an appropriate security services for a user based on a set of user credentials and a type or instance of an application, according to various embodiments.

FIG. 4 illustrates a flow diagram for a process 300 of selecting an appropriate security services for a user based on a set of user credentials and a type or instance of an application, according to embodiments of the present teachings. The user and/or application can be in the same network or different networks than the security delegate. In 302, the process can begin. In 304, security delegate, for example security delegate $30_1$ can receive a set of user authentication credentials $5_1$. For example, security delegate can receive a set of user authentication credentials $5_1$ from a user via network 1 or network 2. The set of user authentication credentials $5_1$ can include, for example, a user-name, a password, a token, a key, etc. Each machine 20 or 60 and/or application, including type and instance of application, in networks 1 and 2 can have a unique defined security level, for example, Kerberos, RAS, digest authentication, LDAP authentication, etc.

In 306, security delegate 30, can determine a type or instance of the application used by the user. Once security delegate 30, identifies the type or instance of the application, a particular security service to be used with the type or instance of the application can be determined in step 308.

As discussed above, the security delegate can also include logic to select the appropriate security service for a set of user credentials and the application. The selection can be based on various information, including the user credentials supplied by the web application, the type of web application, etc. For example, the selection of the security service can be based on where the security credentials originated (what service), the type of user (e.g., internal, including executive, security, administrator, financial, human resources, engineer, etc.; or external, including vendor government vendor, client, etc.; the type of web application, including low security, high security; and other.

As discussed above, embodiments can be applied to more than two networks. Also a user can initially register with a security service, such as, Kerberos, RAS, SSL, etc., to obtain a set of authentication credentials. Also, a user can be authorized through the same or similar method and system using the same or additional security services.

Certain embodiments can be performed as a computer application program. The application program can exist in a variety of forms both active and inactive. For example, the application program can exist as software program(s) comprised of program instructions in source code, object code, executable code or other formats. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" or "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   receiving, by a security delegate module executing by a processing device, a first user authentication credential of a first user by a first application running a first instance in a first network;
   determining, by the security delegate module, a first security level associated with the first application;
   selecting, by the security delegate module, a first security service in view of the first user authentication credential and the first security level associated with the first application;
   sending the first user authentication credential to the selected first security service to at least one of authenticate or authorize a first user to use the first application;
   receiving, by the security delegate module, a second user authentication credential of a second user by the first application;
   selecting, by the security delegate module, a second security service in view of the second user authentication credential and the first security level associated with the first application, wherein the second security service is a different security service from the first security service; and
   sending the second user authentication credential to the selected second security service to at least one of authenticate or authorize the second user to use a second application.

2. The method according to claim 1, wherein the first security service and the second security service are selected from at least one of Kerberos, NT Lan Manager (NTLM) authentication protocol, secure sockets layer/transport security layer (SSL/TSL), token authentication, virtual private network (VPN), remote access security (RAS), digest authentication, or LDAP authentication.

3. The method according to claim 1, wherein the selecting the first security service comprises identifying an origin of the first user authentication credential, and wherein the selecting the second security service comprises identifying an origin of the second user authentication credential.

4. The method according to claim 1, wherein the selecting the first security service comprises identifying a type of the first user and wherein the selecting the second security service comprises identifying a type of the second user.

5. The method according to claim 4, wherein the type of the first user comprises at least one of a user internal to the first network or a user external to the first network, wherein the type of the second user comprises at least one of a user internal to the first network or a user external to the first network.

6. The method according to claim 1, wherein the first user is associated with a first security level for accessing at least one of the first network or the first application, and wherein the second user is associated with a second security level for accessing the first application.

7. The method according to claim 1, further comprising:
receiving, by the security delegate module, a third user authentication credential of the first user by the second application;
determining, by the security delegate module, a second security level associated with the second application;
selecting, by the security delegate module, a third security service in view of the third user authentication credential and the second security level associated with the second application, wherein the third security service is a different security service from the first security service; and
sending the third user authentication credential to the selected third security service to at least one of authenticate or authorize the first user to use the second application.

8. An apparatus comprising:
a memory; and
a processing device communicably coupled to the memory, wherein the processing device is to execute a security delegate module to:
receive a first user authentication credential of a first user by a first application running a first instance in a first network;
determine a first security level associated with the first application;
select a first security service in view of the first user authentication credential and the first security level associated with the first application;
send the first user authentication credential to the selected first security service to at least one of authenticate or authorize a first user to use the first application;
receive a second user authentication credential of a second user by the first application;
select a second security service in view of the second user authentication credential and the first security level associated with the first application; and
send the second user authentication credential to the selected second security service to at least one of authenticate or authorize the second user to use a second application.

9. The apparatus according to claim 8, wherein the first security service and the second security service are selected from at least one of Kerberos, NT Lan Manager (NTLM) authentication protocol, secure sockets layer/transport security layer (SSL/TSL), token authentication, virtual private network (VPN), remote access security (RAS), digest authentication, or LDAP authentication.

10. The apparatus according to claim 8, wherein the security delegate module is to identify an origin of the first user authentication credential and to identify an origin of the second user authentication credential.

11. The apparatus according to claim 8, wherein the security delegate module is to identify a type of the first user, and wherein the security delegate module is to identify a type of the second user.

12. The apparatus according to claim 11, wherein the type of the first user comprises at least one of a user internal to the first network or a user external to the first network, and wherein the type of the second user comprises at least one of a user internal to the first network or a user external to the first network.

13. The apparatus according to claim 8, wherein the first user is associated with a first security level for accessing at least one of the first network or the first application.

14. A non-transitory machine-readable storage medium having instructions, which when executed by a processing device, cause the processing device to perform operations comprising:
receiving, by a security delegate module executing by a processing device, a first user authentication credential of a first user by a first application running a first instance in a first network;
determining, by the security delegate module, a first security level associated with the first application;
selecting, by the security delegate module, a first security service in view of the first user authentication credential and the first security level associated with the first application;
sending the first user authentication credential to the selected first security service to at least one of authenticate or authorize a first user to use the first application;
receiving, by the security delegate module, a second user authentication credential of a second user by the first application;
selecting, by the security delegate module, a second security service in view of the second user authentication credential and the first security level associated with the first application, wherein the second security service is a different security service from the first security service; and
sending the second user authentication credential to the selected second security service to at least one of authenticate or authorize the second user to use a second application.

15. The non-transitory machine-readable storage medium of claim 14, wherein the first security service and the second security service are selected from at least one of Kerberos, NT Lan Manager (NTLM) authentication protocol, secure sockets layer/transport security layer (SSL/TSL), token authentication, virtual private network (VPN), remote access security (RAS), digest authentication, or LDAP authentication.

* * * * *